United States Patent
Lindoff et al.

(10) Patent No.: US 8,892,096 B2
(45) Date of Patent: Nov. 18, 2014

(54) DISCONTINUOUS TRANSMISSION SCHEME

(75) Inventors: Bengt Lindoff, Bjarred (SE); Stefan Parkvall, Stockholm (SE); Pal Frenger, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 354 days.

(21) Appl. No.: 13/520,297

(22) PCT Filed: Feb. 24, 2010

(86) PCT No.: PCT/SE2010/050212
§ 371 (c)(1),
(2), (4) Date: Jul. 2, 2012

(87) PCT Pub. No.: WO2011/105939
PCT Pub. Date: Sep. 1, 2011

(65) Prior Publication Data
US 2013/0012202 A1   Jan. 10, 2013

(51) Int. Cl.
| | |
|---|---|
| *H04W 88/08* | (2009.01) |
| *H04W 4/00* | (2009.01) |
| *H04W 48/16* | (2009.01) |
| *H04W 76/04* | (2009.01) |

(52) U.S. Cl.
CPC ............ *H04W 48/16* (2013.01); *H04W 76/048* (2013.01)
USPC ......................... 455/434; 455/452.1; 455/561

(58) Field of Classification Search
USPC ................... 455/434–435.3, 450–452.2, 561
See application file for complete search history.

(56) References Cited

U.S. PATENT DOCUMENTS

| | | |
|---|---|---|
| 5,790,589 A | 8/1998 | Hutchison, IV et al. |
| 6,097,709 A | 8/2000 | Kuwabara |
| 2003/0026242 A1 | 2/2003 | Jokinen et al. |

(Continued)

FOREIGN PATENT DOCUMENTS

| | | |
|---|---|---|
| EP | 1 962 454 A1 | 8/2008 |
| EP | 2 134 123 A1 | 12/2009 |

(Continued)

OTHER PUBLICATIONS

International Search Report, International Application No. PCT/SE2010/050212, Nov. 25, 2010.

(Continued)

*Primary Examiner* — Kashif Siddiqui
(74) *Attorney, Agent, or Firm* — Myers Bigel Sibley & Sajovec, P.A.

(57) ABSTRACT

A base station transmits signals on a frequency ($f_1$) in an active transmission interval (TI) having a starting time and being part of a transmission cycle (TC) including other active transmission intervals for other frequencies ($f_0$, $f_1$, $f_2$, $f_3$) appearing in a predetermined discontinuous transmission scheme that specifies the relationship ($\Delta_1$, $\Delta_2$, $\Delta_3$) between the starting times of the active transmission intervals of the frequencies of the set. The mobile station scans the set of frequencies during a scanning cycle (SC) corresponding to the transmission cycle (TC) and determines the frequencies at which the base stations transmit. The start of each scanning is made at a point in time that is specified for the corresponding frequency by the discontinuous transmission scheme and the scanning of one frequency involves ending scanning of this frequency at the end of a time range (TR) of pre-determined length if no signal is detected within this time range.

17 Claims, 5 Drawing Sheets

DTX SCHEME

(56) References Cited

U.S. PATENT DOCUMENTS

| | | | |
|---|---|---|---|
| 2009/0270103 A1* | 10/2009 | Pani et al. | 455/436 |
| 2009/0274086 A1* | 11/2009 | Petrovic et al. | 370/312 |
| 2013/0252659 A1* | 9/2013 | Jia et al. | 455/522 |

FOREIGN PATENT DOCUMENTS

| | | |
|---|---|---|
| JP | 10 174158 | 6/1998 |
| JP | 2000 175238 | 6/2000 |
| JP | 2009 044564 | 2/2009 |
| JP | 2009 302798 | 12/2009 |
| WO | WO 00/10336 A2 | 2/2000 |

OTHER PUBLICATIONS

Written Opinion of the International Searching Authority, PCT Application No. PCT/SE2010/050212, Aug. 28, 2012, 7pg.

International Preliminary Report on Patentability, PCT Application No. PCT/SE2010/050212, Aug. 28, 2012, 8 pg.

* cited by examiner

FIG. 1

DTX SCHEME

FIG. 7 ically much longer than the ordinary frame length used for
DISCONTINUOUS TRANSMISSION SCHEME

CROSS REFERENCE TO RELATED APPLICATION

This application is a 35 U.S.C. §371 national stage application of PCT International Application No. PCT/SE2010/050212, filed on 24 Feb. 2010, the disclosure and content of which is incorporated by reference herein in its entirety. The above-referenced PCT International Application was published in the English language as International Publication No. WO 2011/105939 A1 on 1 Sep. 2011.

TECHNICAL FIELD

The invention relates to the provision of a discontinuous transmission scheme in a radio communication network and how such a scheme is to be handed by a mobile terminal. More particularly, the invention relates to a method for finding base stations, a mobile station capable of finding base stations and a computer program product for making a mobile station find base stations. The invention also relates to a method for transmitting signals from a base station, a base station comprising at least one radio communication unit configured to transmit such signals as well as a computer program product for making a base station transmit signals.

BACKGROUND

Traditionally base stations or cells in wireless wide area networks, such as cellular networks, have been transmitting continuously on some carriers, for instance on known broadcast carriers, i.e. on known and dedicated carrier frequencies.

In this way mobile stations have been able to determine which base stations or cells are in their neighbourhood through merely scanning all possible carriers and frequencies, detect data identifying the base station or cell in question and then connect to the network via the most suitable base station.

However, in future networks, such as LTE (Long Term Evolution) it is of interest for the base stations to be silent, e.g. for the purpose of reducing energy consumption as well as inter-cell interference, in a cell for long durations of time, typically much longer than the ordinary frame lehgth used for ordinary communication. This also makes it harder for mobile stations to determine what frequencies and carriers are provided in their vicinity such carriers and consequently also to connect to a radio communication network.

There is therefore a need for improvement in this field of technology.

The present invention is directed towards improving on this situation, where base stations may be silent during long periods of time, e.g. are operating in a low activity mode.

SUMMARY

One aspect of the present invention is directed towards speeding up the identification in a mobile station of the presence of radio frequencies on which base stations transmit, when the surrounding network is operating in a silent or low activity mode.

This object is according to a first aspect of the invention achieved through a method, in a mobile station, for finding base stations in a radio communication network. The method comprises the steps: scanning a set of frequencies assigned for transmission by base stations in active transmission intervals of a transmission cycle, where the set of frequencies are associated with a pre-determined discontinuous transmission scheme specifying the relationship between the starting times of the active transmission intervals of the frequencies in the set and scanning is performed during a scanning cycle corresponding to the transmission cycle, and determining the frequencies at which the base stations transmit.

The start of each scanning is made at a point in time that is specified for the corresponding frequency by the discontinuous transmission scheme and the scanning of one frequency involves ending scanning of this frequency at the end of a time range of pre-determined length corresponding to the length of the active transmission interval if no signal is detected within this time range.

This object is according to a second aspect of the invention achieved through a mobile station capable of finding base stations in a radio communication network, where the mobile station comprises at least one radio communication unit that is configured to scan a set of frequencies assigned for transmission by base stations in active transmission intervals of a transmission cycle, where the set of frequencies is associated with a pre-determined discontinuous transmission scheme specifying the relationship between the starting times of the active transmission intervals of the frequencies in the set, and the scanning is performed during a scanning cycle corresponding to the transmission cycle, and determine the frequencies at which the base stations transmit.

The start of each scanning is made at a point in time that is specified for the corresponding frequency by the discontinuous transmission scheme and the scanning of one frequency involves ending scanning of this frequency at the end of a time range of pre-determined length corresponding to the length of the active transmission interval if no signal is detected within this time range.

Here the radio communication unit may be equipped with a scanning control unit for performing the scanning and determining the frequencies.

This object is according to a third aspect of the invention achieved through a computer program product for making a mobile station find base stations in a radio communication network, which computer program product comprises computer program code that when run in the mobile station, causes the mobile station to:

scan a set of frequencies assigned for transmission by base stations in active transmission intervals of a transmission cycle, which set of frequencies is associated with a pre-determined discontinuous transmission scheme specifying the relationship between the starting times of the active transmission intervals of the frequencies in the set, where the scanning is performed during a scanning cycle corresponding to the transmission cycle, and determine the frequencies at which the base stations transmit.

The start of each scanning is made at a point in time that is specified for the corresponding frequency by the discontinuous transmission scheme and the scanning of one frequency involves ending scanning of this frequency at the end of a time range of pre-determined length corresponding to the length of the active transmission interval if no signal is detected within this time range.

It should here be realized that the start of a scanning can involve the mobile station waiting until the active transmission interval of a frequency it desires to scan is due to be transmitted. It can also involve the mobile station scanning the frequency that is currently being transmitted at a current point in time or is to be transmitted next in relation to the current point in time.

In one variation of the invention, the starting times specified by the discontinuous transmission scheme depend on the corresponding frequencies.

According to one variation of the invention the method comprises the further step of estimating the degree of correspondence of the local timing used by the mobile station and the network timing used in the radio communication network and the step of scanning is performed if the degree of correspondence is found to be sufficient.

According to the same variation of the invention, the radio communication unit of the mobile station may be further configured to estimate the degree of correspondence of the local timing used by the mobile station and the network timing used in the radio communication network and perform the scanning if the degree of correspondence is found to be sufficient. The estimation of the degree of correspondence may be performed by a timing correspondence determining module of the radio communication unit.

According to the same variation of the invention the computer program code of the computer program product may also be further configured to estimate the degree of correspondence of the local timing used by the mobile station and the network timing used in the radio communication network and perform the scanning if the degree of correspondence is found to be sufficient.

It is here possible that the degree of correspondence is estimated to be sufficient if the timing of the mobile station is estimated to differ from the timing of the network by half of the active transmission interval length or less.

According to a further variation of the invention, the method further comprises the step of adjusting the timing of the mobile station based on an estimated difference between the local and network timing if the degree of correspondence is found to be insufficient.

According to this variation, the radio communication unit of the mobile station may be further configured to adjust the timing of the mobile station based on an estimated difference between the local and network timing if the degree of correspondence is found to be insufficient. This may also be performed by a timing correspondence determining module of the radio communication unit.

According to the same variation the computer program code of the computer program product may also be further configured to adjust the timing of the mobile station based on an estimated difference between the local and network timing if the degree of correspondence is found to be insufficient.

Here the scanning may be performed after the local timing has been adjusted.

According to yet another variation of the invention, the method comprises the further step of performing a pre-scanning of one frequency in the set until a signal is received or a scanning time out period is reached corresponding to the transmission cycle and performing the step of scanning on all the frequencies of the set if a signal is received on the one frequency.

According to this variation, the radio communication unit of the mobile station may be further configured to perform a pre-scanning of one frequency in the set until a signal is received or a scanning time out period is reached corresponding to the transmission cycle and perform the scanning on all the frequencies of the set if a signal is received on the one frequency. Here the pre-scanning may be performed by a pre-scanning control module.

According to the same variation the computer program code of the computer program product may also be configured to perform a pre-scanning of one frequency in the set until a signal is received or a scanning time out period is reached corresponding to the transmission cycle and perform the scanning on all the frequencies of the set if a signal is received on the one frequency.

In case a scanning time out period is reached, the performing of the pre-scanning can be repeated for another frequency in the set.

The frequency transmission scheme may also correspond to a frequency reception scheme used by the mobile station in a discontinuous reception mode.

Another object of the present invention is to enable a mobile station to more easily identify the presence of radio frequencies on which base stations transmit when the surrounding network is operating in a silent mode.

This is according to fourth aspect of the present invention solved through a method for transmitting signals from a base station in relation to at least one cell handled by the base station, where the method comprises the step of transmitting signals on at least one frequency, where the transmission on a frequency is made in an active transmission interval having a starting time and being part of a transmission cycle including other active transmission intervals for other frequencies. The at least one frequency is included in a set of frequencies appearing in a pre-determined discontinuous transmission scheme, which specifies the relationship between the starting times of the active transmission intervals of the frequencies of the set and where the starting time of the transmission on the at least one frequency has the relationship to the starting times of the other frequencies of the set defined for this frequency by the discontinuous transmission scheme.

This is according to a fifth aspect of the present invention also achieved through a base station comprising at least one radio communication unit, which is configured to transmit signals on at least one frequency, where the transmission on a frequency is made in an active transmission interval having a starting time and being part of a transmission cycle including other active transmission intervals for other frequencies. The at least one frequency is included in a set of frequencies appearing in a pre-determined discontinuous transmission scheme, which specifies the relationship between the starting times of the active transmission intervals of the frequencies of the set and where the starting time of the transmission on the at least one frequency has the relationship to the starting times of the other frequencies of the set defined for this frequency by the discontinuous transmission scheme.

The transmission may with advantage be provided using a transmission control module of the radio communication unit.

This is also according to a sixth aspect of the invention achieved through a computer program product for making a base station that handles at least one cell transmit signals, where the computer program product includes computer program code which when run in the base station causes the base station to transmit signals on at least one frequency, where the transmission on a frequency is made in an active transmission interval having a starting time and being part of a transmission cycle including other active transmission intervals for other frequencies. The at least one frequency is included in a set of frequencies appearing in a pre-determined discontinuous transmission scheme, which specifies the relationship between the starting times of the active transmission intervals of the frequencies of the set and where the starting time of the transmission on the at least one frequency has the relationship to the starting times of the other frequencies of the set defined for this frequency by the discontinuous transmission scheme According to one variation of the invention, the method may comprise the further step of entering an energy savings mode in relation to a cell of the network if there are no mobile stations requiring data traffic via the cell, where the transmission in the active transmission interval is made in this energy savings mode.

According to this variation the radio communication unit of the base station may be further configured to enter an energy savings mode in relation to a cell of the network if there are no mobile stations requiring data traffic via the cell, where the transmission in the active transmission interval is made in this energy savings mode.

According to this variation the computer program code of the computer program may be further configured to enter an energy savings mode in relation to a cell of the network if there are no mobile stations requiring data traffic via the cell, where the transmission in the active transmission interval is made in this energy savings mode.

According to another variation of the present invention, the method may comprise the further step of exiting the energy savings mode in relation to a cell if there is at least one mobile station requiring data traffic via the cell.

According to this variation the radio communication unit of the base station may be further configured to exit the energy savings mode in relation to a cell if there is at least one mobile station requiring data traffic via the cell.

The determination of if an energy savings mode is to be left or entered may be performed by an energy saving determining module of the radio communication unit.

According to this variation the computer program code of the computer program may be further configured to exit the energy savings mode in relation to a cell if there is at least one mobile station requiring data traffic via said cell The invention has many advantages. It allows a fast cell search to be performed in a mobile station when base stations are transmitting in a discontinuous transmission mode. This speed is achieved even if the mobile station cannot receive all frequencies specified in the discontinuous transmissions scheme. This can furthermore be done without the mobile station having to be exactly aligned in time with the transmissions of the base stations or requiring the base stations to resume normal operation. There may thus exist a timing difference between mobile station and base stations. In this way it is also possible to save energy and reduce the mean time between repair of a base station.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

Cellular systems of today often employ a radio communication network, like an access network, for providing base stations handling cells to which mobile stations are able to connect. In these networks it is nowadays also of interest for the cells or base stations to have longer periods of time when they are not transmitting, i.e. when they are silent.

This silence may for instance be kept when there are no mobile stations requiring data traffic, which data traffic may include messaging, multimedia sessions and voice and video sessions. Silence may also be kept in order to save energy. Another reason why silence may be of interest is because a radio circuit can be used a longer time without need to repair. The MTBF (Mean Time Between Failure) may thus be increased. This time of silence discussed here is typically longer than the radio frame used for transmission, i.e. longer than the format of normal radio transmissions.

However in order for a mobile station, often denoted user equipment (UE), to be able to actually find these cells or base stations, there has to be some logic in the way transmissions are made.

Because of this there is a need for a silent or low-activity mode, where the base stations are turned off for a fairly long period of time and turned on for a shorter time. This means that a base station may transmit for a cell in an active transmission period, where normal synchronisation signals and broadcast channels are provided, which is followed by an idle period where there are no transmissions.

This type of silent mode may therefore stipulate that the base station is to refrain from performing downlink transmissions in a cell if there are no or very few active mobile terminals, except for intermittent transmissions of the signals necessary for active terminals in the proximity of the base station to find the idle cell. This is especially of interest where macro cells overlay micro cells. In case of low load, idle terminals can camp on the macro cells and hence use their synchronisation symbols to be synchronized with the network.

As a radio communication network knows to which cells active terminals are connected, it is then straightforward to identity "empty" or very low load cells. Once a terminal moves into the area covered by the idle cell, the base stations needs to wake up and resume normal transmission as well as reception of signals. In order to determine if the base station should resume normal behaviour it may be necessary to detect if a terminal is moving into the idle cell. Such a terminal expects a certain signal, like synchronization signals, reference signals and broadcast channels, in order to be able to find the cell. Therefore despite being in low activity mode, the signals necessary for mobility are intermittently transmitted. The potential energy reduction is here approximately proportional to Ta/(Tp+Ta), where Ta is the duration of the active period and Tp is the duration of the idle period.

The value of Ta should be selected large enough for allowing the mobile terminal to find synchronisation signals with sufficiently high probability of success as well as for being able to perform signal measurements on the cell. The time needed for this depends on the signal-to-noise ratio at the terminal, but if Ta is in the order of 100 ms to 1 s, the probability of being unable to find the idle cell can be expected to be sufficiently low.

The value of Tp should be large enough to allow for a significant reduction in energy consumption. At the same time a too large Tp means that terminals may not find the idle cell. A typical value of Tp may be in the order to 1-10 s.

In order to enable long DTX also for macro cells, it may be necessary to ensure that mobile stations are able to perform initial cell search and mobility measurements on cells in low activity mode. Initial cell search may here be performed through extending the original cell search procedure of the mobile station, where first normal cell search is performed, in which case the mobile station is only able to detect cells in normal operating mode. If this procedure fails, the mobile station may perform extended cell search in order to find cells in low activity mode. Since the base station is only performing intermittent transmissions, the mobile station will need to measure longer on each candidate frequency in order to detect these frequencies.

This extended cell search may in some cases lead to an exceptionally long cell search compared to a normal cell search.

In order to simplify for a mobile station to be able to locate base stations in this scenario, embodiments of the present invention proposes a discontinuous transmission scheme that may be followed by the base stations. With knowledge about this scheme a mobile station can then be able to locate the base stations relatively fast even though they are silent for long periods of time.

One measure that may be implemented to quicken up such cell search is therefore to provide a transmission sequence in which the cells are transmitting, which sequence simplifies the issue of identifying the cells if the mobile station knows this sequence.

Figure 1:
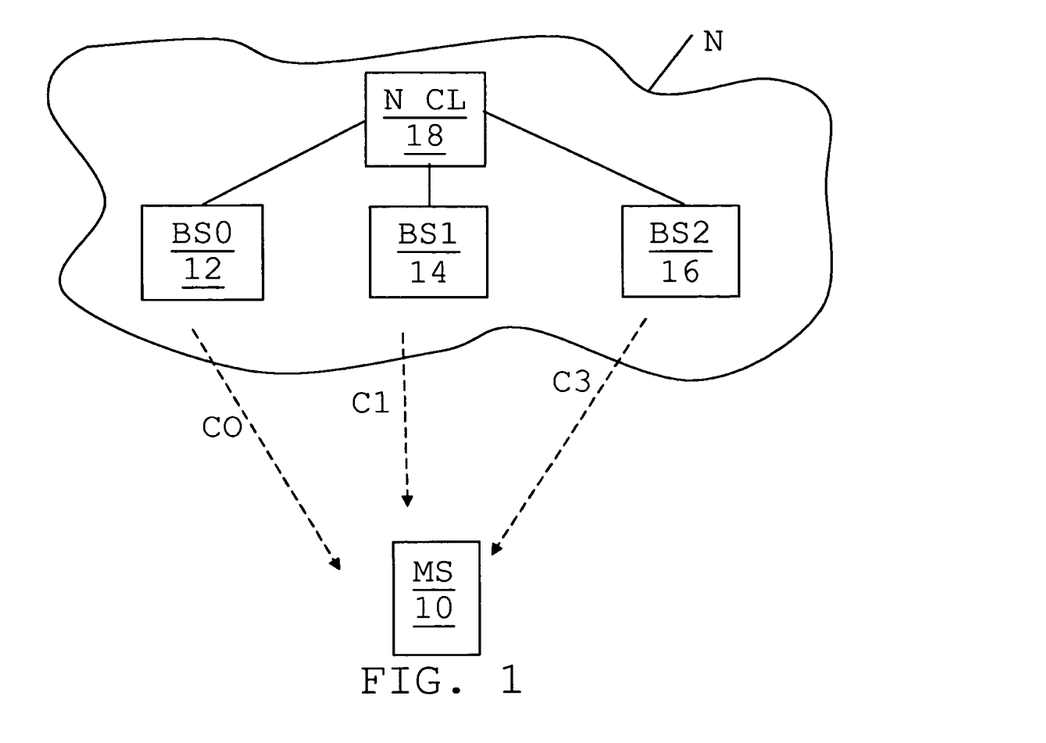
FIG. 1 schematically shows a radio communication network including a number of base stations transmitting signals on a number of carriers and a mobile station that is within range of these carriers, FIG. 2 schematically shows the timing of a transmission cycle including a set of frequencies according to a discontinuous transmission scheme provided for the radio communication network.
Figure 2:
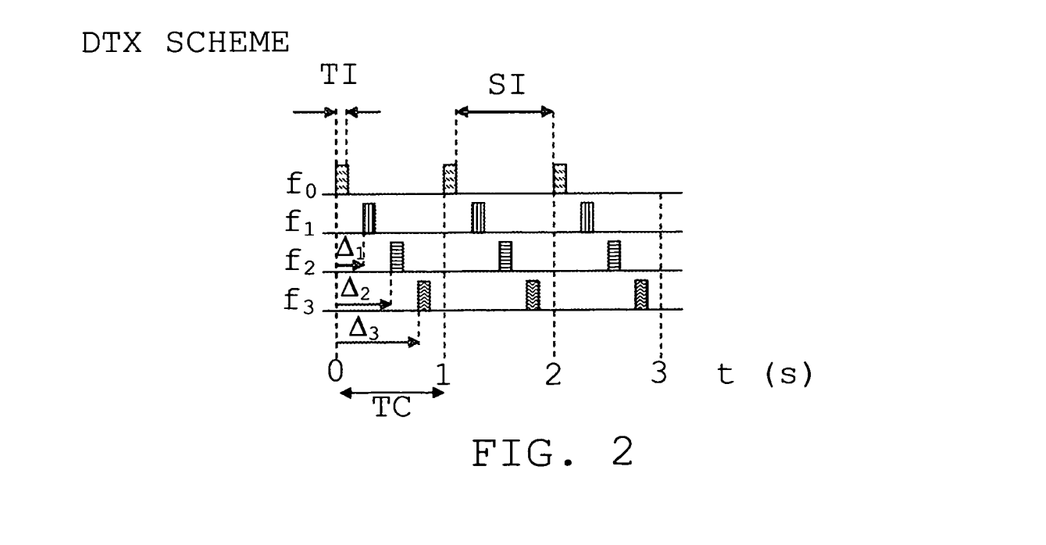

Such a situation is schematically disclosed by FIGS. 1 and 2,

FIG. 1 schematically shows a number of base stations 12, 14 and 16 in a part of a wireless network. This part is here an access network or a radio communication network N. There is here a reference base station BS0 12, a first further base station BS1 14 and a second further base station BS2 16. Each base station furthermore transmits data on at least one carrier at a certain radio frequency, where such data may be synchronisation data and broadcast data. A base station may cover more than one cell and it may therefore transmit on more than one carrier, where each such carrier may be assigned to a different cell. However in order to simplify the description of embodiments of the present invention each base station in this example only covers one cell and therefore transmits data on one carrier at one frequency. The base stations are thus transmitting on carriers. These transmissions are furthermore synchronised with a discontinuous transmission (DTX) scheme. The base stations are thus synchronising their transmissions with the discontinuous transmission scheme.

The reference base station 12 here transmits at a reference carrier C0 having a reference frequency $f_0$, while the first further base station 14 transmits on a first further carrier C1 at a first further frequency $f_1$. The second additional base station 16 transmits on a third further carrier C3 at a third further frequency $f_3$. These carriers are all transmitted according to the above-described discontinuous transmission scheme, which will be described later. However, in order to be able to follow this scheme they are all connected to a network clock N_CL 18.

A mobile station 10 is here within the range of these base stations and would be able to receive data on a carrier if tuned to the frequency of that carrier.

How a discontinuous transmission scheme may be provided will now be described with reference to FIG. 2, which schematically shows the timing of a transmission cycle including a group of frequencies according to the discontinuous transmission scheme.

As indicated above the base stations may enter an energy saving mode in which they transmit data more infrequently, i.e. be silent for a long period of time, which may be done because the base station enters an energy savings mode. In order for a mobile station, like the mobile station 10, to be able to detect these infrequent transmissions they are made according to the exemplifying discontinuous transmission scheme in FIG. 2. They are therefore transmitting in a long DTX mode or low activity mode, which mode may be entered when there are no mobile stations in the neighbourhood of the base stations requiring their assistance.

The way transmissions could be structured in this DTX mode is schematically shown in FIG. 2. The frequencies $f_0$, $f_1$, $f_2$ and $f_3$ of four carriers are here shown. These frequencies are frequencies in a set of frequencies appearing in the pre-determined discontinuous transmission scheme. Of these one is the reference frequency $f_0$ and two others are the first and third further frequencies $f_1$ and $f_3$ of the first and second further base stations 14 and 16. In this scheme there is also a second further frequency $f_2$ associated with yet another base station. These frequencies are according to the discontinuous transmission scheme transmitted in consecutive transmission cycles TC. There is here a first transmission cycle stretching between an exemplifying time of zero to a first second, a second transmissions cycle from the first second to a second second and a third transmission cycle from the second second to a third second. As an example each cycle may thus be one second long. As mentioned earlier, the transmission cycle is here much longer than the ordinary frame length used in ordinary network transmissions and then especially in ordinary broadcast channel transmissions.

The discontinuous transmission scheme here specifies a transmission sequence for the carriers. This means that the transmissions at the various radio frequencies follow each other in a certain order, which order may be specified in a standard. The transmission on a frequency is furthermore performed in a limited active transmission interval TI of a transmission cycle TC. This interval TI may be equal in size for all the different frequencies. However, it should be realized that this is no requirement. The active transmission intervals TI may thus differ from each other. Each active transmission interval of a frequency is followed by a silence interval SI, where these two intervals together have the same length as the transmission cycle TC. One active transmission interval TI and one silence interval SI for a certain frequency is thus one transmission cycle long. As can be seen in FIG. 2, the beginning of an active transmission interval need furthermore not follow immediately after the end of a previous active transmission interval. There may thus be silence between active transmission intervals. It is also possible that the active transmission intervals of different frequencies are provided directly after each other or that they may overlap each other.

As can furthermore be seen in FIG. 2, the transmissions on the frequencies are staggered in time. The sequence of frequencies according to the discontinuous transmissions scheme is here exemplified as beginning with the reference frequency $f_0$, followed by the first further frequency $f_1$. Then there is the second further frequency $f_2$ and finally the third further frequency $f_3$.

According to the embodiments of the invention, not only the sequence or order in which the frequencies appear in the scheme is known. Also the time relationship between the active transmission intervals is known. There is here a first relationship in the form of a first time difference $\Delta_1$ between the starting time of the active transmission interval in which the reference frequency $f_0$ is transmitted and the starting time of the active transmission interval of the first further frequency $f_1$. There is also a second relationship in the form of a second difference $\Delta_2$ between the starting time of the active transmission interval of the reference frequency $f_0$ and the starting time of the active transmission interval of the second further frequency $f_2$. There is finally a third relationship in the form of a third difference $\Delta_3$ between the starting time of the active transmission interval of the reference frequency $f_0$ and the starting time of the active transmission interval of the third further frequency $f_3$. The starting time of the transmission at each frequency is therefore provided at a time defined by the discontinuous transmission scheme. The transmissions scheme may thus specify the relationship between the starting times of the active transmission intervals. In some variations of the invention the time of transmission at a frequency can depend on the actual frequency. This means that the length of the time difference can in fact correspond to the frequency or the difference between the two frequencies, the reference frequency and the further frequency. It can thus be a function of the carrier frequency. The time difference can here be provided for frequencies separated by 200 kHz from each other. In this way it is possible for other entities, like mobile stations, to know of the time differences merely by knowing the frequencies used for transmitting and perhaps knowing which frequency is the reference frequency.

It should here also be known that the invention is in no way limited to using a reference frequency in this way, but that any other way of providing the required information can be used. It should also be known that more or fewer frequencies may be used according to the discontinuous transmissions scheme.

In this way a known transmission scheme is provided, where the base stations keep track of when they are to transmit with the help of the network clock.

Figure 3:
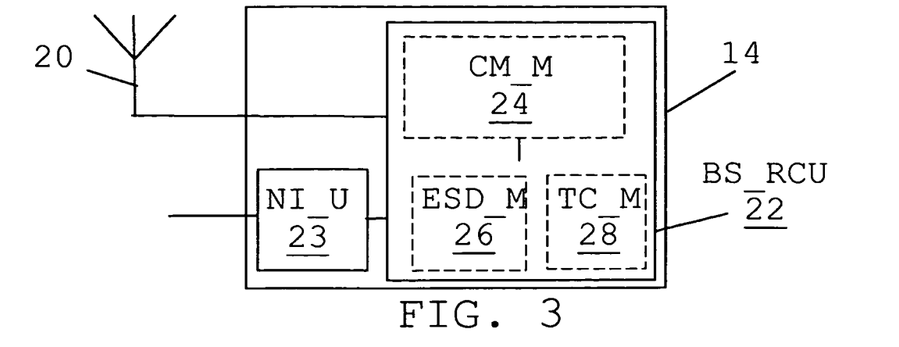
FIG. 3 shows a simplified block schematic of one base station.

FIG. 3 schematically shows a block schematic of the first further base station 14 according to one variation of the invention. The base station, often denoted eNB in this type of network, includes a network interface unit NI_U 23 for enabling communication with other devices in the access network N, such as with the network clock 18 as well as for being able to communicate with devices in other parts of the network, such as various communication handling servers and other base stations. The base station 14 is also provided with a radio communication unit BS_RCU 22 in order to communicate with mobile stations. For this reason the radio communication unit 22 is connected to an antenna 20. The radio communication unit 22 here includes a number of modules used for performing a method according to an embodiment of the invention. It here includes a carrier modulation module 24 as well as an energy saving determining module ESD_M 26 and a transmission control module TC_M 28.

Figure 4:
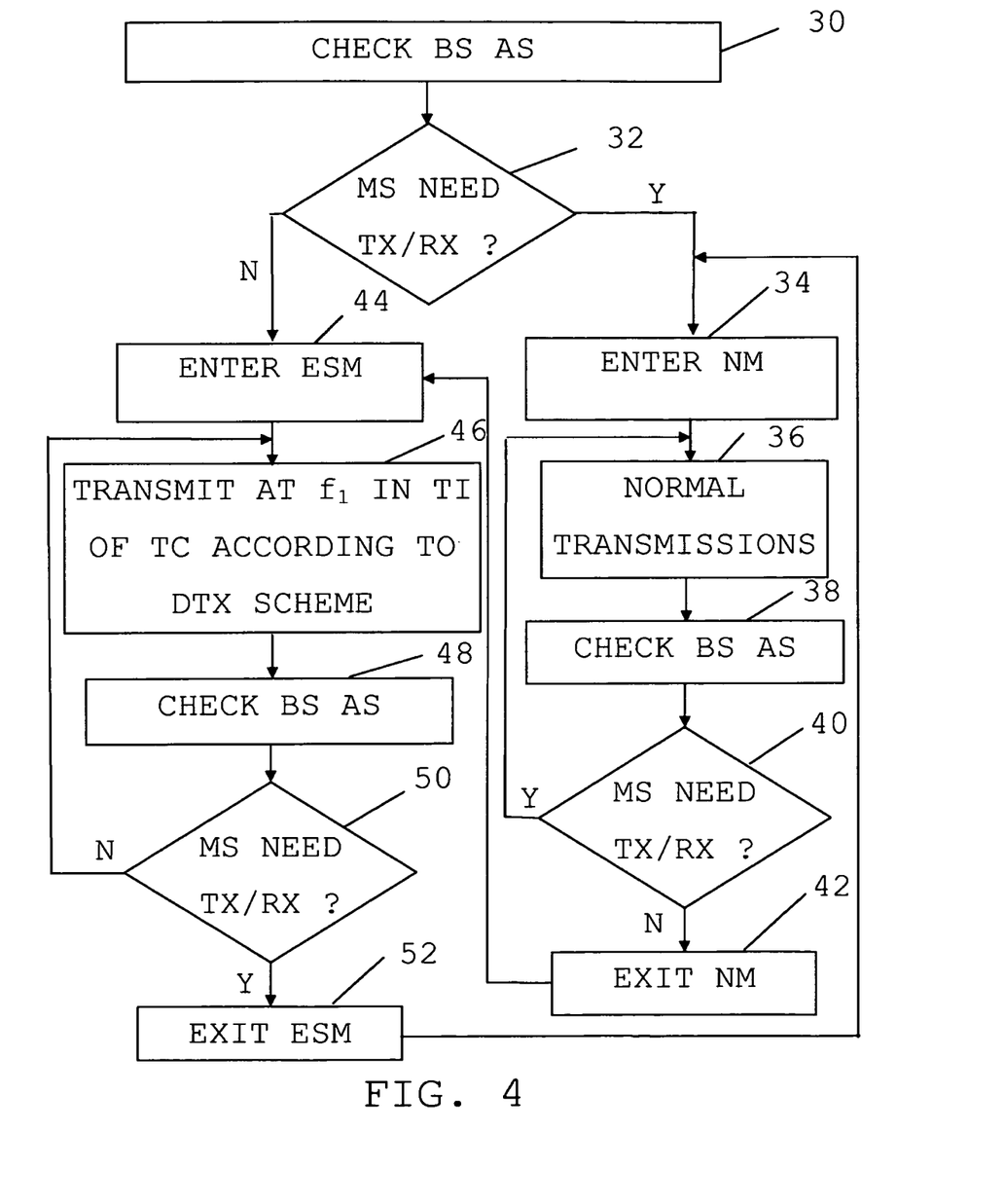
FIG. 4 shows a flow chart of a number of method steps being performed in a method being performed in the base station of FIG. 3, FIG. 5 schematically shows the timing of some frequencies in the set of the discontinuous transmission scheme together with scanning of all the frequencies of the set by the mobile station.

The operation of the first further base station 14 in order to be able to transmit in the discontinuous transmission scheme will now be described with reference to the above described FIGS. 1, 2 and 3 as well as to FIG. 4, which shows a flow chart of a number of method steps being performed in the first further base station.

The first further base station 14 may keep track of if it is to enter a DTX mode when it is to transmit according to the above described DTX scheme. This may be done through checking the base station activity status BS AS of this first further base station 14, step 30. Such activity status AS may be checked by the energy saving determining module 26 investigating if queries regarding any communication to be provided via the antenna 20 is received either through the antenna itself or the network interface unit 23. These queries are typically requests for communication in relation to a mobile station received via any of these two interfaces.

The energy saving mode is thus entered in dependence of if there are any mobile stations requiring data traffic via a cell provided by the base station or not. Such a query could concern a handover in relation to another base station or a call set up to or from a mobile station. In this way the energy saving determining module 26 determines if a mobile station MS needs to transmit (tx) or receive (rx) data. If at least one mobile station does need communication, step 32, the base station 14 enters a normal mode NM, step 34, while if no mobile station needs to communicate, then the base station 14 enters an energy saving mode ESM in relation to at least one cell where the DTX mode is applied, step 44. The energy saving determining module 26 informs the transmission control module 28 about which mode is to be used. In the normal mode, the transmission control module 28 controls the carrier modulating module 24 to act normally for performing normal transmissions, step 36, i.e. to for instance continuously transmit data on the carrier C1. When in this normal mode, the energy saving determining module 26 continually checks the base station activity status, step 38, and as long as mobile stations need to receive and/or transmit data, step 40, then normal transmissions are being made, step 36. However, if no mobile stations need to communicate, step 40, then the normal mode is left, step 42 and the energy saving mode is entered, step 44.

In the energy saving mode, the transmission control module 28 controls the carrier modulating module 24 to transmit data at the first further frequency $f_1$ in the active transmission interval TI assigned to this frequency in the transmission cycle TC by the DTX scheme, step 46. The transmission has a starting time that has been defined for this frequency by the discontinuous transmissions scheme. The starting time therefore has the relationship to the starting times of the other frequencies of the set that is defined by the discontinuous transmission scheme. Data is thus transmitted, and here modulated onto the first carrier C1. This data includes synchronisation data. It is also possible that other data is transmitted such as cell identifying data. Then the transmission control module 28 keeps the first further base station 14 silent during the silence interval SI, after the end of which transmissions are again made according to the DTX scheme. This way of operation is then continued for as long as the base station is in this energy saving mode. All this time, the energy saving determining module 26 keeps on checking if any mobile station needs to communicate, step 48, and if no one does, step 50, operation in energy saving mode is continued, while if any mobile station needs communication, step 50, then the energy saving mode is left, step 52, and the normal mode is entered, step 34.

In this way it is possible for a base station to save energy when not needed while at the same time ensuring that mobile stations can reach it if they have knowledge of the transmission scheme.

Figure 5:
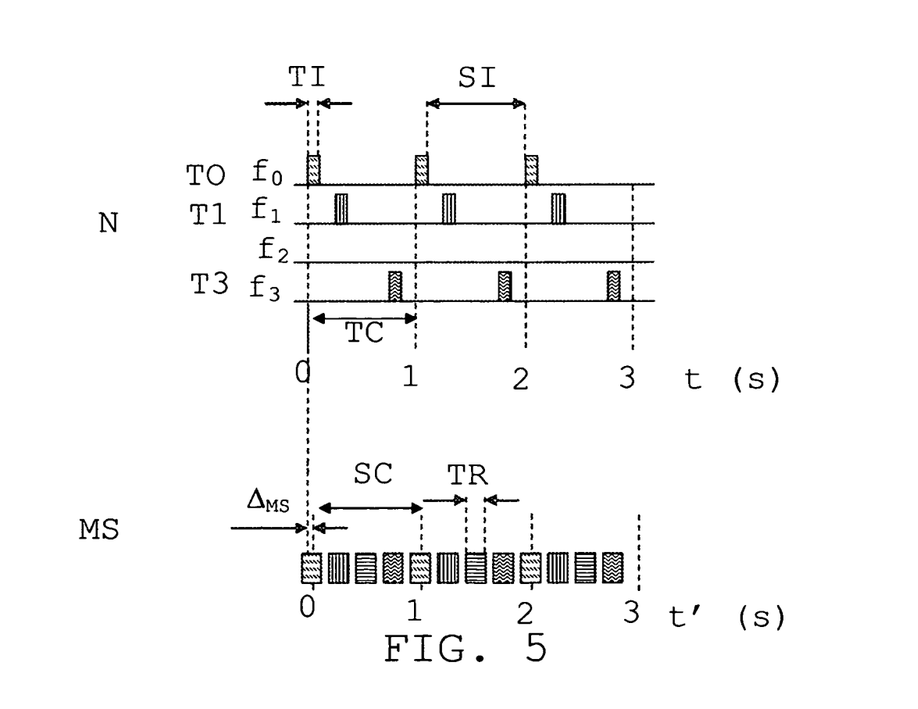
Figure 6:
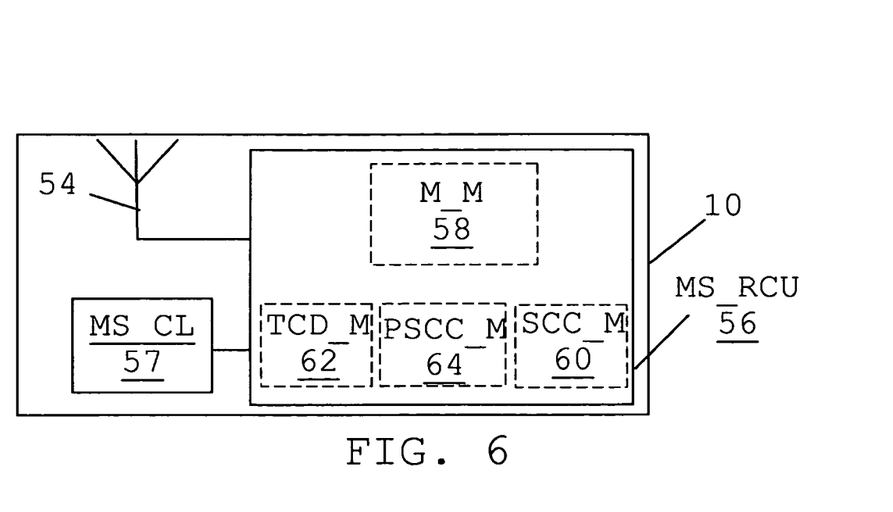
FIG. 6 shows a simplified block schematic of the mobile station.
Figure 7:
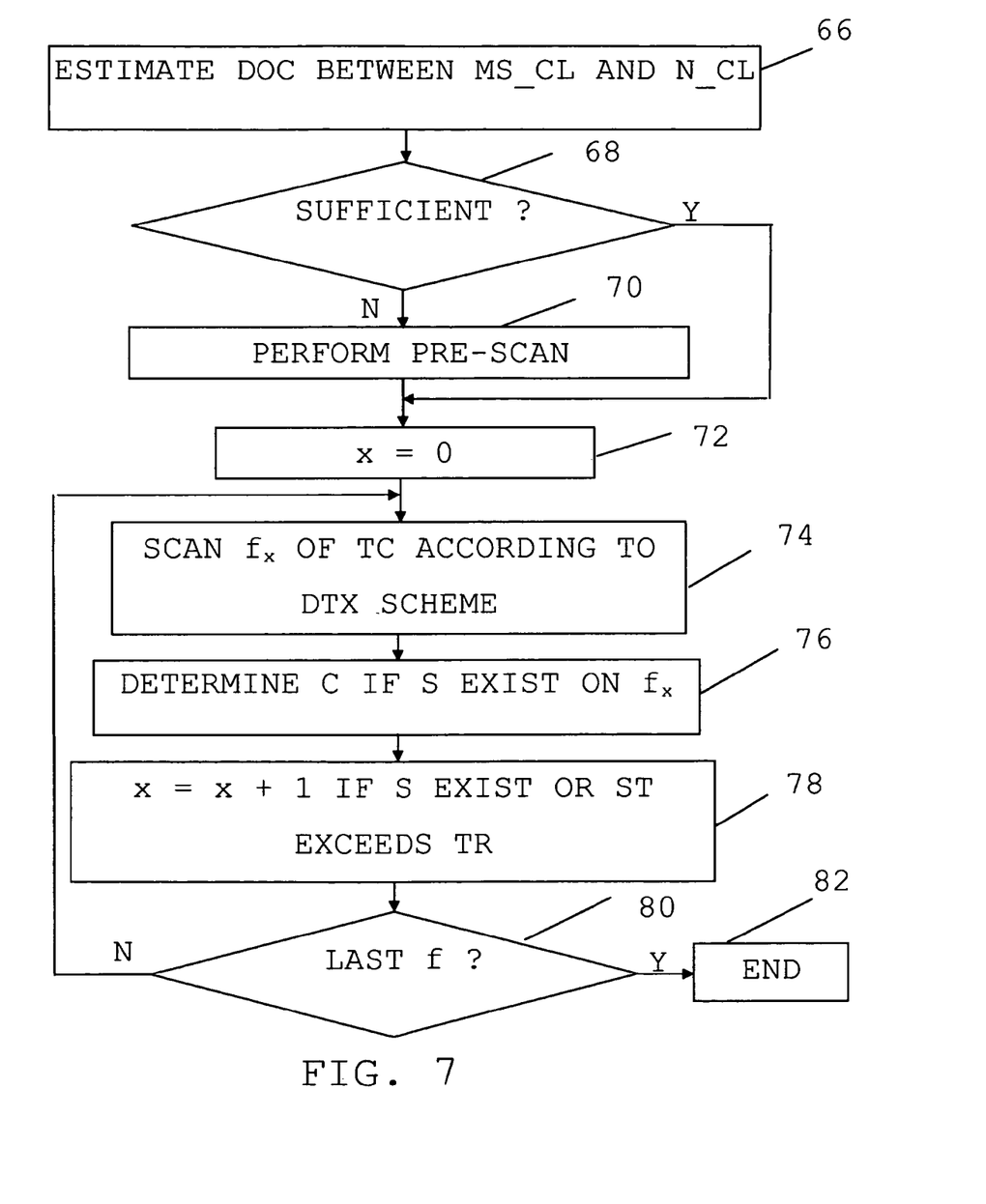
FIG. 7 shows a number of method steps in a method for finding radio frequencies according to an embodiment of the invention being performed by the mobile station, and FIG. 8 schematically shows a computer program product according to an embodiment of the invention in the form of a CD ROM disc on which a computer program realizing the methods of the invention is stored.

An exemplifying mobile station 10 that may need to get in contact with a base station operating according to the above principles will now be described with reference being made to FIGS. 5, 6 and 7, where FIG. 5 schematically shows the timing of the transmission cycles TC according to the discontinuous transmission scheme and the scanning of the frequencies of the scheme by the mobile station, FIG. 6 shows a simplified block schematic of the mobile station and FIG. 7 shows a number of method steps in a method of finding radio frequencies according an embodiment of the invention.

In the upper part of FIG. 5, the same transmission sequence as is disclosed in FIG. 2 is shown, with one important exception. There are no signals on the second further frequency $f_2$. This is of importance to some embodiments of the invention.

Traditionally a mobile station searching for cells in a cell search procedure would listen on a certain radio frequency for as long as possible until signals are received. However, if there are frequencies which the mobile station cannot receive, which is the case with the second further frequency $f_2$, this could mean that the mobile station would listen for a very long time until it finally decides that there are no signals, which could result in even more serious delays when base stations are operating in a silent mode.

If however the mobile station is aware of the transmission sequence, it may continue to a following frequency of the scheme instead if no signals are received, which is the case in at least some embodiments of the invention.

As can be seen in the bottom part of FIG. 5, the timing of the mobile station may not be synchronised with the timing of the radio communication network, which may the case if the mobile station has been turned off for a long time. Then it may not know where the start and end of the transmission cycle TC is. It may thus be out of synchronisation. As can be seen in this figure there is thus a difference $\Delta_{MS}$ between the timing of the mobile station and the timing of the network.

In the lower part of FIG. 5 there is also shown how the mobile station has a scanning cycle SC in which it scans the frequencies of the transmission cycle TC. Each frequency of the scanning cycle is scanned in a time range TR. This time range is here shown to be longer than the active transmission interval of the corresponding transmission in the transmission cycle. The scanning cycle corresponds to the transmission cycle, i.e. includes the same frequencies in the same order in time ranges corresponding to the active transmission intervals. The time differences between the time intervals may also be the same as the time differences between the active transmission intervals. The scanning cycle SC is typically equal in length to the transmission cycle, however displaced with an unknown difference $\Delta_{MS}$.

FIG. 6 shows a block schematic of the mobile station 10. This includes a clock MS_CL 57, a local clock, connected to a radio communication unit MS_RCU 56, which radio communication unit 56 is in turn connected to an antenna 54. In the radio communication unit 56 there is furthermore provided a timing correspondence determining module TCD_M 62, a pre-scanning control module PSCC_M 64, a scanning control module SCC_M 60 and a measuring module M_M 58.

In operation, typically after the mobile station has been turned on after having been turned off for a long time, i.e. at power on of the mobile station, or after being turned on for the first time, the timing correspondence determining module 62 estimates the degree of correspondence DOC between the local timing provided by the local mobile station clock 57 and the network timing used in the network N and provided by the network clock, step 66. This may be done in a number of ways. The drift of the local clock may be known, i.e. how much faster or slower it is than the network clock. This drift can then be compared with how long the local clock has been separated from the network. The drift and elapsed time may be used to provide a timing error. An estimation can also be made even if this drift is not known, for instance based on historical data.

After the degree of correspondence has been estimated, it or the timing error is then compared with a threshold, typically a threshold that in size corresponds to the active transmission interval TI within which transmissions on a frequency are being made in the network. This threshold may be set to half of the active transmission interval length or less. It is thus possible to compare the above-described timing error with the threshold. If the degree of correspondence is sufficient, step 68, i.e. equal to half the active transmission interval length or less in the example above, then the timing correspondence determining module 62 informs the scanning control module 60 that a scanning should be performed. If not, step 68, then the timing correspondence determining module 62 may adjust the local timing of the mobile station through adjusting the local clock 57 and then informing the scanning control module 60 that a scanning should be performed. In this embodiment it does not do that, instead it informs the pre-scanning control module 64 to perform a pre-scanning, which module 64 in this case performs a pre-scanning, step 70, through tuning to a frequency, such as the reference frequency $f_0$ and making the measurement module 58 measure any signals appearing on this frequency, for instance through performing signal strength measurements. The measurement module 58 then continuously measures the signal strength and as soon as any signals are received, which in a worst case may happen up to almost a full transmission cycle has passed, then the pre-scanning control module 64 is informed of this fact by the measuring module 58, which pre-scanning control module 64 goes on and informs the scanning control module 60 that a full scan is to be made. It is here possible to apply a scanning time out period, which if being reached, causes a pre-scan of another frequency in the set of frequencies to be made.

As a full scan is being made, the scanning control module 60 first sets a counter x to zero, step 72, and then scans the first frequency of the scheme, i.e. first in the order of the scheme, at the time it should appear in the transmission scheme, step 74. It thus scans frequency $f_x$ of the transmission cycle TC according to the discontinuous transmission scheme. The start of the scanning is thus made at a point in time that is specified for the frequency by the scheme. This scanning could also here be performed through tuning to the frequency and making the measurement module 58 measure if there are any signals there. If a pre-scanning is performed, then the frequency on which signals were found in this pre-scanning could also make up the first frequency of the ordinary scanning. The first frequency scanned in this way is in this example the reference frequency $f_0$. The scanning control module 60 here scans the frequency in a time range TR that in length corresponds to the active transmission interval TI of this frequency. This time range can be the same as the active transmission interval of the carrier, but it may also be shorter or longer. It may with advantage be slightly longer. The time range therefore has a pre-determined length corresponding to the length of the active transmission interval of the transmission cycle. As long as the local clock has a sufficient degree of correspondence this time range is set to ensure that signals transmitted on the frequency in the active transmission interval will be received and measured. If the measurements provided by the measurement module 58 then indicates that there are signals S on the frequency, the carrier C is determined by the scanning control module 60, step 76, and then the counter is incremented (x=x+1) if there were signals or if the scanning time ST, i.e. the time in which the scanning was performed, becomes equal to or exceeds the time range TR, step 78.

As the time range TR is set to correspond to the active transmission interval TI, signals S should have been received within the time range if there were any. This means that if there were no signals on the particular frequency, the scanning of this frequency would be ended at the end of the time range TR, while if there were signals on the frequency, the scanning could have been ended earlier, like as soon as signals were detected. It is also possible to continue scanning to the end of the time range TR. Thereafter the scanning control unit 60 investigates if the last frequency of the sequence was scanned and if it was, step 80, then scanning is ended, step 82, while if it was not, step 80, then the next frequency is scanned, step 74. Scanning and determining of carrier is then continued in the above-described manner until all frequencies of the discontinuous transmissions scheme have been scanned.

In this way it is possible to scan the various frequencies of the DTX scheme in an efficient way and without having to wait for signals when there are none. In this way an efficient scanning is allowed for a DTX scheme even if the timing of the radio communication network is not known.

It should here be realized that there are a number of variations that may be made in the present invention. It is for instance possible for the radio communication network to control when active mobile stations perform mobility measurements, since this allows for long DTX without putting any additional search burden on the mobile stations.

The transmission scheme may furthermore be selected to match a discontinuous reception (DRX) scheme used by the mobile station. This means that if the mobile station wakes up and is to perform neighbouring cell measurements according to this reception scheme, it is beneficial if they follow each other.

Here it should also be mentioned that the pre-scanning and/or local time investigation may be omitted. The invention can be performed without these measures.

The invention has many advantages. It allows a fast cell search to be performed in a mobile station when base stations are transmitting in a discontinuous transmission mode. This speed is achieved even if the mobile station cannot receive all frequencies specified in the discontinuous transmissions scheme. This can furthermore be done without the mobile station having to be exactly aligned in time with the transmissions of the base stations or requiring the base stations to resume normal operation. There may thus exist a timing difference between mobile station and base stations. In this way it is also possible to save energy and reduce the mean time between repair of a base station.

There are several ways in which the mobile station may receive information about the discontinuous transmission scheme. The mobile station could have received knowledge of the discontinuous transmission scheme from the radio communication network. Alternatively the discontinuous transmission scheme could be a part of the communication standard of the network. It could also be provided to the mobile station via a SIM card or some other data carrier.

A base station can leave the idle mode in relation to a cell that it handles when it detects that a mobile station is performing random access. In addition, as handover is controlled by the network sending commands to the mobile station, the network can also wake up idle base stations in conjunction with the handover procedure. The first further base station 14 in FIG. 1 commanding a mobile station to perform handover to the second further base station 16, would in addition to the handover command to the mobile station also send a wake up command to the second further base station 16.

Figure 8:
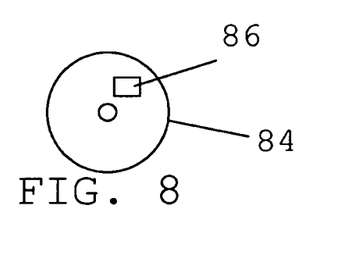

The radio communication units described above may advantageously each be provided in the form of a processor with associated program memory including computer program code for performing the functionality of a radio communication unit. It should be realized that such a unit may also be provided in the form of hardware, like for instance in the form of an ASIC circuit. The invention may also be provided as software. This means that the invention may be provided as computer program code which when run in a processor in a mobile station or a base station, causes the mobile station or base station to perform the functionality of a radio communication unit. This program code could furthermore be provided on a data carrier, like a CD ROM disc or a memory stick, which will implement the above described functionality when being loaded into a mobile station. One such computer program product in the form of a CD ROM disc 84 on which such computer program code 86 is stored is schematically shown in FIG. 8.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method, in a mobile station, for finding base stations in a radio communication network (N), the method comprising the steps of:
   scanning a set of frequencies assigned for transmission by base stations in active transmission intervals (TI) of a transmission cycle (TC), said set of frequencies being associated with a pre-determined discontinuous transmission scheme specifying a relationship between starting times of the active transmission intervals of the frequencies in the set, said scanning being performed during a scanning cycle (SC) corresponding to the transmission cycle (TC), and
   determining the frequencies at which the base stations transmit,
   wherein the start of each scanning is made at a point in time that is specified for the corresponding frequency by the discontinuous transmission scheme and the scanning of one frequency involves ending scanning of this frequency at the end of a time range (TR) of pre-determined length corresponding to the length of the active transmission interval (TI) if no signal is detected within this time range.

2. The method according to claim 1, wherein the starting times specified by the discontinuous transmission scheme depend on the corresponding frequencies.

3. The method according to claim 1, further comprising the step of estimating a degree of correspondence of the local timing used by the mobile station and the network timing used in the radio communication network and performing the step of scanning in response to the degree of correspondence being determined to be sufficient.

4. The method according to claim 3, wherein the degree of correspondence is estimated to be sufficient in response to the timing of the mobile station being estimated to differ from the timing of the network by no more than half of the active transmission interval length.

5. The method according to claim 3, further comprising the step of adjusting the timing of the mobile station based on an estimated difference between the local and network timing in response to the degree of correspondence being determined to be insufficient.

6. The method according to claim 5, wherein the step of scanning is performed after the local timing has been adjusted.

7. The method according to claim 1, further comprising the step of performing a pre-scanning of one frequency in the set until a signal is received or a scanning time out period is reached corresponding to the transmission cycle and performing the step of scanning on all the frequencies of the set in response to a signal being received on said one frequency.

8. The method according to claim 7, wherein in the case of a scanning time out period being reached, repeating the step of performing a pre-scanning of another frequency in the set.

9. The method according to claim 1, wherein the frequency transmission scheme corresponds to a frequency reception scheme used by the mobile station in a discontinuous reception mode.

10. A mobile station capable of finding base stations in a radio communication network (N), the mobile station comprising:
at least one radio communication unit that is configured to:
scan a set of frequencies assigned for transmission by base stations in active transmission intervals (TI) of a transmission cycle (TC), said set of frequencies being associated with a pre-determined discontinuous transmission scheme specifying a relationship between starting times of the active transmission intervals of the frequencies in the set, said scanning being performed during a scanning cycle (SC) corresponding to the transmission cycle (TC), and
determine the frequencies at which the base stations transmit, wherein the start of each scanning is made at a point in time that is specified for the corresponding frequency by the discontinuous transmission scheme and the scanning of one frequency involves ending scanning of this frequency at the end of a time range (TR) of pre-determined length corresponding to the length of the active transmission interval (TI) if no signal is detected within this time range.

11. A computer program product for making a mobile station find base stations in a radio communication network (N), the computer program product comprises computer program code, on a non-transitory computer readable medium, which when run in the mobile station, causes the mobile station to:
scan a set of frequencies assigned for transmission by base stations in active transmission intervals (TI) of a transmission cycle (TC), said set of frequencies being associated with a pre-determined discontinuous transmission scheme specifying a relationship between the starting times of the active transmission intervals of the frequencies in the set, said scanning being performed during a scanning cycle (SC) corresponding to the transmission cycle (TC), and
determine the frequencies at which the base stations transmit, wherein the start of each scanning is made at a point in time that is specified for the corresponding frequency by the discontinuous transmission scheme and the scanning of one frequency involves ending scanning of this frequency at the end of a time range (TR) of pre-determined length corresponding to the length of the active transmission interval (TI) if no signal is detected within this time range.

12. A method for transmitting signals from a base station in relation to at least one cell handled by said base station, the method comprising the step of:
transmitting signals on at least one frequency where the transmission on a frequency is made in an active transmission interval (TI) having a starting time and being part of a transmission cycle (TC) including other active transmission intervals for other frequencies,
wherein said at least one frequency is included in a set of frequencies appearing in a pre-determined discontinuous transmission scheme, said discontinuous transmission scheme specifying a relationship between the starting times of the active transmission intervals of the frequencies of the set, and
wherein the starting time of said transmission on said at least one frequency has the relationship to the starting times of the other frequencies of the set defined for this frequency by the discontinuous transmission scheme.

13. The method according to claim 12, wherein the frequency transmission scheme corresponds to the frequency reception scheme used by the mobile station in a discontinuous reception mode.

14. The method according to claim 12, further comprising the step of entering an energy savings mode in relation to a cell of the network in response to determining that there are no mobile stations requiring data traffic via said cell, where the transmission in said active transmission interval is made in said energy savings mode.

15. The method according to claim 13, further comprising the step of exiting the energy savings mode in relation to a cell in response to determining that there is at least one mobile station requiring data traffic via said cell.

16. A base station comprising:
at least one radio communication unit that is configured to:
transmit signals on at least one frequency, where the transmission on a frequency is made in an active transmission interval (TI) having a starting time and being part of a transmission cycle (TC) including other active transmission intervals for other frequencies,
wherein said at least one frequency is included in a set of frequencies appearing in a pre-determined discontinuous transmission scheme, said discontinuous transmission scheme specifying a relationship between the starting times of the active transmission intervals of the frequencies of the set, and
wherein the starting time of said transmission on said at least one frequency has the relationship to the starting times of the other frequencies of the set defined for this frequency by the discontinuous transmission scheme.

17. A computer program product for making a base station that handles at least one cell transmit signals, the computer program product comprises computer program code, on a non-transitory computer readable medium, which when run in the base station causes the base station to:
transmit signals on at least one frequency where the transmission on a frequency is made in an active transmission interval (TI) having a starting time and being part of a transmission cycle (TC) including other active transmission intervals for other frequencies, wherein said at least one frequency is included in a set of frequencies appearing in a pre-determined discontinuous transmission scheme, said discontinuous transmission scheme specifying a relationship between the starting times of the active transmission intervals of the frequencies of the set and wherein the starting time of said transmission on said at least one frequency has the relationship to the starting times of the other frequencies of the set defined for this frequency by the discontinuous transmission scheme.

\* \* \* \* \*

UNITED STATES PATENT AND TRADEMARK OFFICE
CERTIFICATE OF CORRECTION

PATENT NO. : 8,892,096 B2 Page 1 of 1
APPLICATION NO. : 13/520297
DATED : November 18, 2014
INVENTOR(S) : Lindoff et al.

It is certified that error appears in the above-identified patent and that said Letters Patent is hereby corrected as shown below:

On the Title Page, in item (57), under "ABSTRACT", in Column 2, Line 6, delete "$(\Delta_1, A_2, A_3)$" and insert -- $(\Delta_1, \Delta_2, \Delta_3)$ --, therefor.

In the Specification

In Column 10, Line 24, delete "antenna" and insert -- antenna 20 --, therefor.

Signed and Sealed this
Thirtieth Day of June, 2015

Michelle K. Lee
*Director of the United States Patent and Trademark Office*